United States Patent [19]

Ackerman et al.

[11] Patent Number: 5,322,725
[45] Date of Patent: Jun. 21, 1994

[54] THERMAL PROTECTION SYSTEM

[75] Inventors: Patrice K. Ackerman, Kent; Anna L. Baker; Charles W. Newquist, both of Seattle, all of Wash.

[73] Assignee: The Boeing Company, Seattle, Wash.

[21] Appl. No.: 238,957

[22] Filed: Aug. 31, 1988

[51] Int. Cl.$^5$ ............................................. B32B 3/10
[52] U.S. Cl. .................................................... 428/137
[58] Field of Search ......................................... 428/137

[56] References Cited

U.S. PATENT DOCUMENTS

| | | | |
|---|---|---|---|
| 3,734,172 | 5/1973 | Clifford | 165/96 |
| 3,814,175 | 6/1974 | Laing et al. | 165/96 |
| 4,428,895 | 1/1984 | Blasch et al. | 264/28 |
| 4,482,111 | 11/1984 | Le Touche | 244/117 A |
| 4,552,800 | 11/1985 | Blasch et al. | 428/212 |
| 4,592,950 | 6/1986 | Le Touche | 428/284 |
| 4,849,276 | 7/1989 | Bendig et al. | 428/117 |

Primary Examiner—Donald P. Walsh
Assistant Examiner—Chrisman D. Carroll
Attorney, Agent, or Firm—John C. Hammar

[57] ABSTRACT

A passive thermal protection system that overcomes the disadvantages of the polyurethane "water wall" includes a fiberformed ceramic insulation, a plurality of electrodes embedded in the insulation to define a wick panel, and a gelled ceramic sol in the wick panel. The system can be prepared by introducing the sol into the wick panel with its subsequent gelling by applying a direct current across the electrodes. Cooling water is held in the gelled sol to provide passive cooling, yet the system easily achieves even distribution of the water (even when subject to accelerations) without the use of pre-gelled or viscous reagents.

16 Claims, 1 Drawing Sheet

THERMAL PROTECTION SYSTEM

TECHNICAL FIELD

The present invention relates to ceramic insulation for aerospace vehicles, particularly to insulation having passive cooling capability of the "water wall"-type.

BACKGROUND OF THE INVENTION

Aerospace vehicles (spacecraft or high speed aircraft) encounter high skin temperatures because of resistance with the surrounding atmosphere and develop large temperature gradients across the skin. To protect these vehicles, several thermal protection systems have been used combining active and passive cooling techniques. Two problems are faced. First, the skin material must be able to withstand the high temperature. Second, the large gradient across the skin must be controllable to maintain the compartment within the vehicle at a habitable temperature.

For spacecraft, the high skin temperatures require ceramic skins and the gradient problem is resolved simply by the short duration of the exposure (during lift-off or re-entry). Low density ceramics are required to reduce the vehicle weight, yet the insulation must be sufficiently strong and durable to withstand the rigors of space travel. In copending U.S. patent application Ser. No. 698,496, Anna Bendig (Baker), now U.S. Pat. No. 5,041,321, describes a fiberformed ceramic insulation possessing desirable physical and chemical properties for this space vehicle application.

For high speed aircraft, the problem that is most difficult to solve is the thermal gradient Longer flights, even at lower maximum skin temperatures, can create internal temperatures that approach the skin temperature unless cooling is provided A passive thermal protection system for the X-20 aircraft used a water-saturated, open-cell polyurethane foam (sponge) between the metallic skin and the inner compartment wall. Cooling capitalized on the large latent heat of vaporization of the retained water.

This sponge "water wall" concept presented numerous problems. The foam could degrade or decompose after extended exposure to high temperatures, especially if it dried out. Minor decomposition posed outgassing problems; extensive decomposition posed risks of total system failure. The water in the foam had to remain dispersed throughout the foam, even during high accelerations, for the system to operate effectively. Accordingly, a gelling agent was used to thicken the water. To be compatible with the foam, cyanides were often used in the gelling agent, posing toxicological problems both during installation and use. Repair and inspection of the system (which was essential because of the risk of decomposition of the foam) required removal of the skin. Such inspection hindered reusability of the vehicles because it was time-consuming and required skilled labor The foam was difficult to saturate, and local discontinuities in the water concentration posed the threat of system failure Accordingly, exotic radiographic inspection techniques and water-filling techniques were developed to ensure even and complete dispersion of the water throughout the foam.

In U.S. Pat. Nos. 4,482,111 and 4,592,950, LeTouche of Aerospatiale describes thermal protection or dissipation screens that include a hot wall and a cool wall separated by an insulating layer. The layer includes a stratified hydrating element, a stratified overheating element, and a porous stratified refractory element. The LeTouche system maintains the temperature of the cool wall at or below the vaporization temperature of the hydrating element through the evaporation of the element. In U.S. Pat. No. 4,482,111, LeTouche uses a supple or flexible plastic or ceramic material to hold a gelled liquid, and supplements the cooling achieved by evaporation by including carbon in the refractory element to react with the steam that is created to form water-gas in an endothermic (heat absorbing) reaction.

In U.S. Pat. No. 4,592,950, LeTouche incorporates a reactive substance into the refractory element and a membrane that is impermeable until a predetermined temperature is reached or exceeded. The LeTouche systems are passive devices to protect flight recorders and other critical elements from catastrophic events, and are not designed for reuse or recharging.

Active cooling (refrigeration) requires complicated mechanical systems that are expensive to build and expensive to maintain. Such systems generally are not as reliable as passive systems. With active cooling, it is difficult to avoid localized hot spots without including sophisticated sensors and plumbing in the system.

These problems are substantially overcome with the passive thermal protection system of the present invention.

SUMMARY OF THE INVENTION

A passive thermal protection system for aerospace vehicles includes a layer of fiberformed ceramic insulation (generally of the type described in U.S. patent application Ser. No. 698,496, now U.S. Pat. No. 5,041,321) in combination with a water barrier formed behind the insulation. The barrier holds the water in a gelled ceramic sol. The system of the present invention, thus, combines the advantages of a fully ceramic insulation with the transpiration and cooling benefits of the "water wall" concept while substantially eliminating the drawbacks of the "water wall" system. The ceramic insulation is thermally stable for extended exposures to high temperatures The gelled ceramic sol, rich in water (or ethanol), is essentially rigid (viscous) and easily controllable with respect to its positioning and water content. It provides the passive cooling desired for the system through dehydration of the water that is captured in the gel. The gelled sol can be rehydrated or the barrier can be reconstituted (recharged) with fresh sol. Dehydration deposits alumina ceramic on the ceramic fiberformed insulation that holds the gelled sol.

In accordance with the invention of P. Ackerman and A. Baker, we have found that the ceramic sol can be easily gelled in place after migration through the ceramic matrix by the application of a low voltage direct current Therefore, the system includes a plurality of electrodes embedded in the fiberformed ceramic insulation to allow controlled gellation of the sol after initial infiltration of the sol into the insulation or upon rehydration of the sol following exposure to the high temperatures of flight. The fiberformed insulation between the electrodes functions as a porous bed for receiving the ceramic sol. Evaporating water can transpire through the pores of the insulation, can be vented, or can be reclaimed.

In this thermal protection system, passive cooling is obtained without risk of catastrophic degradation of the system barrier or without generation of toxic liquids or vapors. Accordingly, the benefits of the "water wall"

are retained while the drawbacks are substantially eliminated.

BRIEF DESCRIPTION OF THE DRAWINGS

The FIGURE is schematic isometric of the thermal protection system of the present invention, in partial cut-away.

BEST MODE CONTEMPLATED FOR THE PRESENT INVENTION

Figure 1:
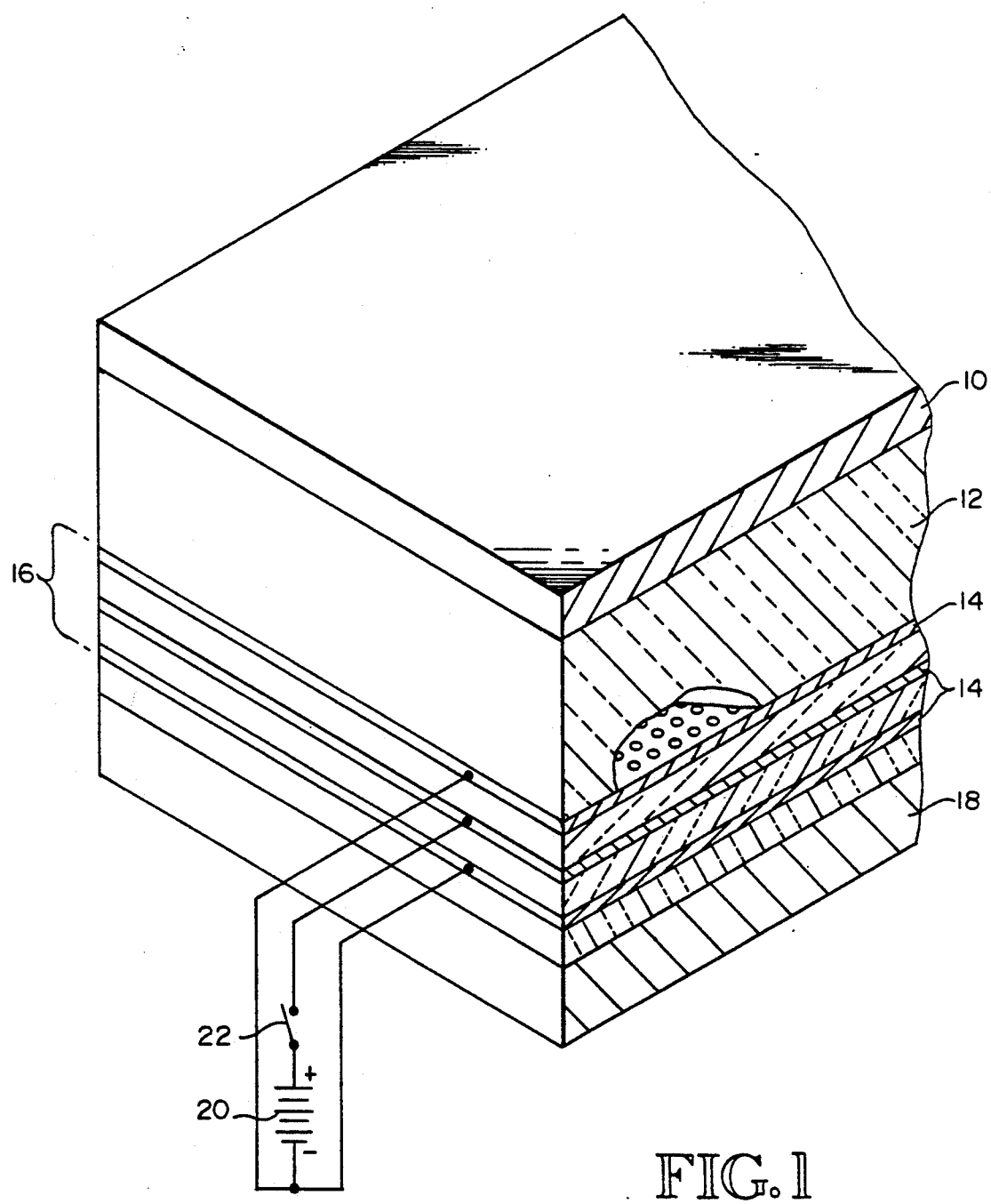

The thermal protection system of the present invention is perhaps best understood (at least in general terms) by reference to the schematic isometric shown in the drawing. There, the aerospace vehicle's skin 10 comprises the upper or outside layer of the vehicle. Immediately below the skin 10, a relatively thick layer of fiberformed ceramic insulation 12 constitutes the initial layer of the thermal protection system. The ceramic insulation 12 might be considered a single thick layer having three electrodes 14 embedded within it near its lower surface or more accurately might be considered to be four separate regions of insulation separated by the electrodes. The electrode-insulation sandwich area defined by the upper and lower electrode with two regions of insulation and a central electrode contained therein is often referred to in this description, for convenience, as the wick panel 16. The innermost layer of insulation abuts the compartment wall 18 of the vehicle.

The three electrodes are connected respectively to the terminals of a direct current source (battery) 20 generally so that the outer most plates are connected to the cathode and are negatively charged while the central plate is the anode and is positively charged. Preferably, the polarity of the plates can be switched, if desired, to allow reversal periodically during use. The period for such reversals, however, will generally be quite long, usually measurable at least in hours. A switch 22 allows the power source to be disconnected from the electrodes 14.

The vehicle's skin 10 is generally metallic, ceramic, or resinoid, and, for conventional aircraft, is an advanced metallic alloy. During flight of the vehicle, the air flow resistance over the skin creates an elevated temperature on the skin and a significant temperature gradient between the skin surface and the compartment wall. Without adequate thermal protection, the compartment wall would soon heat through conductive heat transfer to a temperature comparable to the skin, and the temperature within the compartment would become excessive (uninhabitable). Also, without thermal protection, it would be possible for the skin or compartment wall to reach such a high temperature that it would decompose, melt, or otherwise be destroyed. The thermal protection system of the present invention is designed to avoid such a catastrophe and to retain the compartment environment in a habitable condition.

The thermal protection system operates in two modes with the insulating protection provided by a fiberformed ceramic insulation 12 and the transpirational cooling protection provided by the evaporation of water held within a gelled alumina sol found within the wick panel 16. Because the latent heat of vaporization of water is relatively large, the conversion of liquid water to steam absorbs a significant amount of energy. The evaporation provides cooling on the surface where such evaporation occurs, because conduction is the primary mode of heat transfer.

To avoid a build up of the temperature and/or pressure within the annular area between the compartment wall 18 and vehicle skin 10, the steam which results from evaporation of the water can be vented or can be collected in suitable equipment (not shown) which condenses the water for reclaiming. The particular mission for the vehicle will dictate which of these two alternatives is the most desirable.

The fiberformed ceramic insulation preferred for use in the present invention is described in the copending U.S. patent application Ser. No. 698,496 of Anna Bendig (Baker), now U.S. Pat. No. 5,041,321. Such ceramic insulation is formed by felting a slurry of ceramic fibers to form a soft felt mat, drying the mat, and incrementally introducing a sol-gel glass binder into the mat to form a rigid mat. The incremental addition of the sol-gel binder is accomplished through a unique multiple impregnation technique in which a small amount of binder is initially impregnated into the mat, is gelled, and is cured to stabilize the mat dimensionally. After the initial impregnation, the mat can be easily handled for further processing. Strength of the mat is enhanced thereafter by successive additions of sol-gel glass binder.

The ceramic insulation fiber mat includes a plurality of discrete ceramic fibers that selectively intersect one another in a semi-random fashion with bonds at the intersections formed by the sol-gel glass binder. The insulation may be bonded directly to the surface to be protected, such as to the compartment wall 18, or may be formed on a substrate that is subsequently attached to the surface. For example, the fiberformed ceramic insulation may be felted into the cells of a honeycomb core, as described in copending U.S. patent application Ser. No. 875,807 to Bendig and McLaren, now U.S. Pat. No. 4,849,276.

Generally, when a sol-gel glass binder is used in a felted mat of fiber insulation to bind the junctions of the intersecting fibers, the felted mat will shrink upon gelling. The normal degree of shrinkage in such operations can be tolerated where the formed insulation mat is machined into the final configuration. Where the ceramic fiber insulation is to be formed in situ. However, such as in a honeycomb core application, shrinkage of the mat is more critical, and often, cannot be tolerated. The incremental impregnation and gelling technique of the Baker application provides a desirable process for avoiding shrinkage of the ceramic fiber mat and that method is suited for use where controlled shrinkage is essential.

While rigidified ceramic insulation is preferred, it is possible that the insulation layer can be merely a felted mat of unbound ceramic fibers. The rigidified insulation, however, provides some structural benefit, builds porosity into the material, and reduces the risk of collapse of the felted structure upon stress.

To make the preferred insulation, an aqueous slurry of ceramic fibers are thoroughly mixed to provide a substantially uniform dispersion of the fibers and is then vacuum felted. The slurry generally comprises from about 0.2–0.5 weight percent aluminosilicate fibers and from about 99.5–99.8 weight percent water, but other fibers of silica, alumina, mullite (commercially available under the trademark ULTRAFIBER 440 from 3M Company), zirconia, silicon nitride, or mixtures thereof may be used at different concentrations, as desired. It may be desirable to use fibers of different materials to tailor the insulative characteristics or density of the insulation. For instance, a mat having distinct layers of alumina and aluminosilicate fibers would be useful at higher temperatures. Fibers of mullite or of an alumina-zirconia mixture would reduce the density of the resulting insulation without substantially affecting the temperature limit for the insulation.

The length and diameter of the fibers effects the characteristics of the insulation. Generally, the length of the fibers should be between about one-sixteenth inch to four inches, while the diameter of the fibers should range between about one to three microns. Shorter fibers can be used with conventional cellulose fiber-felting aids. The preferred fibers are about one-quarter inch in length and about one micron in diameter. Longer fibers produce an insulation of increased strength.

Silicon carbide fibers or whiskers with aluminosilicates provide higher emissivity.

The binder is preferably an alumina sol-gel glass that can be prepared using conventional techniques, such as those described by Yoldas. Other sol-gel glasses may be used. For example, a silica sol-gel glass or a sol-gel glass of similar composition to the particular fiber in the mat may be used, if desired.

After the slurry has been thoroughly mixed, it is pulled by vacuum through a filtered mold to form a soft felt mat on the mold. Through selection of the mold, the felt mat can be formed in a variety of shapes, including those with irregular, curved surfaces and those with open interiors, such as hollow cylinders and frustums.

The soft felt mat, usually without the mold, is heated to a temperature of about 200° F. to remove substantially all water from the mat. The best green strength for the dried mat is obtained when the majority of fibers are about one-quarter inch in length and about one micron in diameter. The duration of drying will, of course, depend upon the size and shape of the mat.

Once the mat has been dried, a sol-gel glass binder is introduced in incremental stages. This incremental addition of binder limits shrinkage of the mat and assures good distribution of the binder throughout the mat. Surprisingly higher densities and greater strengths for the insulation results. Incremental addition of the binder involves repeating the steps of impregnating the mat with binder, gelling the binder, and curing the mat and binder. Preferably, a light coating of binder is applied in the first stage with an air-dry gellation to stabilize the fiber mat dimensionally. Thereafter, the steps of impregnating, gelling, and curing are repeated one or more times until the total binder is added. The density and strength of the resulting insulation can be controlled with this multiple binder impregnation technique. Because the configuration of the molded fiber mat is precisely maintained, the process is particularly suited to applications where shrinkage of the mat is a prime concern.

The impregnating step may be accomplished by wicking, spraying, or vacuum infiltrating. Spraying is preferred.

After impregnation, the binder is converted to a rigid gel, usually by air drying or by subjecting the binder-impregnated mat to an atmosphere of ammonia gas. Since the ammonia/sol reaction is exothermic, there is a tendency for bubbles to form in the mat if ammonia is used. This problem is avoided, however, by allowing the first binder to gel in air. Thereafter trapped bubbles are not a problem, and ammonia gellation can be used.

After gelling the binder, the mat is cured, first, by heating the mat to about 200° F. for about four hours, then, by slowly increasing the temperature to about 600° F. over a five-hour period, and, finally, by reducing the temperature to ambient.

The resulting insulation has a relatively high porosity created by voids in the felt.

Improved properties can be obtained by curing the sol-gel binder in an ammonia or other nitrogen-containing gas atmosphere so that nitrogen replaces oxygen in the glass structure. Such a substitution results in enhanced fracture toughness, microhardness, refractoriness, and chemical durability. The method of nitrogen replacement is particularly beneficial when the mat includes additives for emission or conductance which are oxygen sensitive. The nitrogen atmosphere can protect these additives so that higher processing temperatures can be used. As explained by Brinker and Haaland for oxynitride glasses (J. of Am. Ceramic S., vol. 66, No. 11, p. 758–765), nitrogen can interact with oxygen in the glass through hydrogen bonding, can interact with metals in the glass through Lewis acid adsorption, and can replace oxygen entirely through well-known chemical reactions at the surface. In this way, the 3-fold coordination of nitrogen can be introduced into the glass matrix to replace the 2-fold coordination of oxygen, and improves the glass. Nitrogen serves as a crosslinking agent which should increase the glass transition temperature. The microhardness should be increased as well as the sintering temperature, and the thermal expansion characteristics will probably be altered.

Although not preferred for this application because of the thickness of the felted mat, gelling of the sol-gel binder can be accomplished with a low voltage direct current.

The thermal protection system embeds two and preferably three sheet metal electrodes or metal grids within the ceramic insulation. Preferably, each electrode (shown in the cut-away) includes a perforated sheet, because the perforations allow transpiration of steam throughout the insulation. Generally, the multilayer system will be prepared by felting the first layer of ceramic fibers, inserting an electrode, felting an additional layer of fibers, inserting another electrode, and continuing felting. The steps of inserting an electrode and refelting are alternated until the desired number of electrode layers is achieved. We prefer to use three layers of electrodes with a central anode sandwiched between external cathodes. That is, the respective electrodes are electrically connected to the terminals of the direct current source to allow a low voltage direct current to be generated between the electrodes.

If desired, the electrodes may be formed from metallic honeycomb portions embedded within the fiberform ceramic. Electrical isolation can be assured by spacing the honeycomb with a porous, heat-resistant dielectric sheet, but use of a reasonably thick layer of fiberform ceramic alone is preferred.

Additional alumina sol is used as the water barrier in the thermal protection system of the present invention. This alumina sol, which has a viscosity similar to ordinary water, is introduced into the wick panel by wicking (capillary action) or pressure preferably to saturate substantially the volume of the wick panel 16 defined between the outer electrodes. After introduction of the sol, an electric field is created with the electrodes 14 which causes the alumina sol to gel so that it is trapped (and its retained water is bound) within the wick panel 16. This water is available for evaporation when the vehicle encounters a high temperature at its skin. The gelled sol provides an excellent system for confining water even under the forces that result from accelerations. If the gel is not exposed to temperatures greater than about 526° F. for an extended time, the gel can be rehydrated allowing water that evaporates during the flight to be recharged to the system during non-flight conditions. In the event that the temperature within the wick panel does exceed 526° F., the result will be the deposition of an amorphous alumina layer on the ceramic insulation fiber to result in an increase of the strength and ridigity of the fiberformed ceramic. The mat will still be porous, however, and the system can be restored by the introduction of fresh alumina sol-gel instead of water. We do not expect that serious reduction in porosity of the insulation will occur without multiple refreshment of the sol-gel to the wick panel.

The following Examples illustrate how to make ceramic insulation that can be used in the thermal protection system of the present invention. Examples I and II show the surprising increase in strength achieved through incremental additions of sol.

EXAMPLE I

A fiber slurry of 60 gallons of water and 300 grams of aluminosilicate fibers approximately 0.25 inches in length and one micron in diameter was mixed by circulating the components for 30 minutes through a polyethylene-lined, air-operated, double-diaphragm pump into a 90-gallon polyethylene tank. A filter mold was attached to the pump, and 30 gallons of slurry (about ½ the volume) were pulled through the mold, depositing about 150 grams of fiber in a soft mat on the surface of the mold. The mat was removed from the mold and was dried in a circulating-air oven at about 200° F. until all the water was removed.

An alumina sol-gel binder comprising about 459 grams of aluminum isopropoxide, 4053 grams of distilled water, and 18 grams of hydrochloric acid was refluxed at a controlled temperature for three days, and was, then, distilled to a solution containing seven grams of alumina per 100 cc.

The resulting sol was wicked into the dried fiber mat until the entire mat was saturated. To convert the sol to a gel, the saturated mat was placed in a sealed nylon bag with a small outlet tube that was connected to a bottle of ammonia gas. The bag was inflated with gas at a flow rate designed to keep the bag fully expanded. After one hour, the gas was turned off and the bag was opened, allowing the excess gas to escape. The fully gelled mat was removed from the bag, and cured for four hours in an air-circulating oven at about 200° F. After this initial four-hour period, the temperature was slowly increased to 600° F. over a five-hour period, before the temperature was rapidly lowered to 200° F. and maintained at 200° F. for two more hours. The resulting rigid mat had a density of 16 lb/ft$^3$ and a flexural strength of 200 psi.

For these experiments, a sheet of NEXTEL glass fiber cloth was cut to the size of the mat. The surface of the rigid mat was lightly wetted with the alumina sol-gel binder. The cloth, saturated with this binder, was placed on the surface of the mat. A slurry containing 100 grams of −325 mesh borosilicate glass powder and 50 grams distilled water was then brushed onto the cloth. The resulting composite assembly was then heated in an air-circulating oven at 200° F. until dried. The dried assembly was then heated for five minutes at 2000° F. to melt the borosilicate glass, before being removed from the oven to cool and solidify the glass.

Glass top coats generally are not used for the thermal protection system.

EXAMPLE II

The process of Example I was followed to form a rigid mat, except that, after the fully gelled mat was cured, the impregnating, gelling, and curing steps were repeated by (1) resaturating the mat in two successive applications with the alumina sol binder, (2) exposing the saturated mat to ammonia gas for one hour, and (3) then, heating the mat with the same temperature regime as Example I to cure the second addition of binder. The mat had a density of 22 pounds/cubic foot and a flexural strength of 1200 psi, showing the surprising results achieved through incremental binding method of the present invention. The flexural strength increased six-fold by the incremental binding technique.

EXAMPLE III

Four slurries were prepared in the manner described in Example I. Slurry A had no additional ingredients. Slurries B, C, and D included about the following amounts of silicon carbide fibers (an emittance agent): 0.5 g for slurry B; 1.0 g for slurry C; and 3.0 g for slurry D. These four slurries were then molded into a soft felt mat using a filter mold attached to the pump. A first layer was laid down on the mold using 30 gallons of slurry A, depositing a 150-gram soft mat on the mold surface. Successive layers from slurries B, C, and D were deposited on the underlying layers. The resulting mat had a total weight of about 600 grams. This mat was then processed in an identical fashion to Example 1, but without the addition of the glass coating. Through proper molding, different areas of the slurries could be felted at desired locations in the mat.

EXAMPLE IV

A slurry was prepared according to the method of Example I, and contained 750 g of zirconia fiber and 40 g of microcellulose fiber (a felting aid). Following the method of Example I, insulation was prepared, using three impregnations of alumina sol-gel binder. The product had a density of 36 lb/ft$^3$ and a flexural strength of about 314 psi.

EXAMPLE V

A slurry was prepared according to the method of Example I, and contained a sufficient amount of ULTRAFIBER 440, a mullite fiber available from 3M Co. After rigidifying in accordance with the method of Example I, using three impregnations of alumina sol-gel, the product had a density of about 19 lb/ft$^3$.

An important feature of the present invention is the ability to load the ceramic insulation with a readily flowable liquid and gelling (or thickening) the migrating liquid in place. Accordingly, although the sol technique is preferred, other mechanisms might be used, such as a shear thickening fluid that would automatically gel when pumped through the pores of the ceramic insulation. A disadvantage of a shear thickening fluid, however, could be reusability or recharging. The cement created by the shear thickening fluid might permanently clog the pores of the ceramic matrix. Shear thickening fluids that might be considered for this application are described by Exxon. An advantage of this approach would be the elimination of the electrodes since gelling would result by another mechanism.

Reinforcing coatings on the fiberformed ceramic, as illustrated in Examples I or II, are not required in the thermal protection system.

Examples VI–VIII describe the sol gelling process.

EXAMPLE VI

A 1.5 in diameter disk of alumina-silica fiber mat (HSA Fiberfrax) 0.5 in thick was saturated with an alumina sol and was placed on aluminum foil in a pan reservoir. A second piece of aluminum foil was pressed down on the top of the mat in direct contact with the top surface. Leads from a direct current power source (a battery) were clipped to each piece of aluminum foil (negative to the top and positive to the bottom). Ten volts were applied for about 10 minutes at least 0.1 amp. A rigid layer (about 1/32 in) formed adjacent the top surface of the mat at the foil interface. The rest of the mat remained soft (i.e. substantially ungelled).

EXAMPLE VII

An alumina-silica fiber mat 915 lb/ft$^3$ density disk (1" diameter×0.5" thick) was placed in 35 ml of alumina sol in a reservoir. Aluminum foil electrodes were used as in Example 1. Ten volts were applied for 3 hours. Gelled layers developed on the upper and lower surfaces of the mat. Sol in the reservoir also partially gelled (such gelling would not have occurred as rapidly without the catalytic effect of the current).

EXAMPLE VIII

A 2"×2"×0.6" piece of fiber mat was saturated with 39 ml of alumina sol and the impregnated mat was arranged between electrodes as in Example 1. Twenty-eight volts were applied. After two hours, an additional 2.5 ml of sol were added and the polarity was reversed and current was applied for two more hours. Both outer surfaces developed rigid, high density layers caused by gelling of the sol. While the original density was 7.98 lb/ft$^3$, the final density was 15.57 lb/ft$^3$.

Those skilled in the art will understand that the present invention provides a highly flexible approach to the formation of lightweight insulating structures that provide passive cooling and that are suitable for use at high temperatures and with large temperature gradients. Those skilled in the art will also understand that other ceramic fibers, sol-gel binders, and emittance agents may be used. For example, silica, zirconia, mullite, aluminosilicate chromia fibers, or mixtures of fibers may be used. Any inorganic material that can be converted from a sol to a glass may be used as the binder. Alumina sols such a those described by Yoldas are preferred, and include alkoxides dispersed in a water-ethanol carrier. While preferred embodiments have been described, those skilled in the art will readily recognize alterations, variations, or modifications which might be made to the embodiments without departing from the inventive concept. Therefore, the claims should be interpreted liberally with the support of the full range of equivalents known to those of ordinary skill based upon this description. The claims should be limited only as is necessary in view of the pertinent prior art.

We claim:

1. A passive thermal protection system for an aerospace vehicle, comprising:
    (a) a fiberformed ceramic insulation;
    (b) a plurality of electrodes embedded in the insulation and defining a wick panel; and
    (c) a gelled ceramic sol in the wick panel.

2. The system of claim 1 further comprising a direct current source connected to the electrodes.

3. The system of claim 1 wherein the sol is an alumina sol.

4. The system of claim 3 wherein the alumina sol is made from alkoxides in a water/ethanol carrier.

5. The system of claim 1 wherein the insulation comprises a felted mat of ceramic fibers bound with a sol-gel glass binder.

6. The system of claim 5 wherein the sol is an alumina sol made from alkoxides in a water/ethanol carrier.

7. The system of claim 6 further comprising a direct current source connected to the electrodes.

8. The system of claim 1 wherein at least three electrodes are embedded in the insulation.

9. The system of claim 8 wherein each electrode is a perforated metal sheet.

10. The system of claim 6 wherein the insulation includes silicon carbide.

11. A method for making a passive thermal protection system for an aerospace vehicle, comprising the steps of:
    (a) forming a fiberformed ceramic insulation that includes a plurality of electrodes embedded in the insulation to define a wick panel;
    (b) introducing a ceramic sol to the wick panel;
    (c) gelling the sol within the wick region by applying a direct current across the electrodes.

12. The method of claim 11 wherein the step of forming the insulation includes:
    (a) felting a first portion of a ceramic fiberformed insulation;
    (b) positioning a first electrode on the surface of the first portion;
    (c) felting a second portion of ceramic fiberformed insulation on the first electrode;
    (d) positioning a second electrode on the surface of the second portion spaced apart from the first electrode to define the wick region of insulation; and
    (e) felting a third portion of ceramic fiberformed insulation on the second electrode.

13. The method of claim 12 further comprising the step of rigidifying the insulation with a sol-gel glass binder.

14. The method of claim 13 wherein the rigidifying step includes incremental infiltration of portions of the binder into the insulation and gelling the binder following each infiltration substep.

15. The method of claim 11 wherein the sol is an alumina sol made from alkoxides in a water/ethanol carrier.

16. The method of claim 11 wherein the step of introducing comprises substantially saturating the insulation in the wick panel.

* * * * *